(12) United States Patent
Arai et al.

(10) Patent No.: US 6,358,311 B1
(45) Date of Patent: Mar. 19, 2002

(54) ADDITIVES FOR CEMENT MATERIALS AND CEMENT MATERIALS

(75) Inventors: Norihiko Arai, Sakura; Makihiko Ichikawa; Susumu Sano, both of Yachiyo, all of (JP)

(73) Assignee: Taiheiyo Cement Corporation, Tokyo (JP)

( * ) Notice: Subject to any disclaimer, the term of this patent is extended or adjusted under 35 U.S.C. 154(b) by 0 days.

(21) Appl. No.: 09/454,562

(22) Filed: Dec. 7, 1999

(51) Int. Cl.[7] .................. C04B 24/12; C04B 24/16; C04B 28/02
(52) U.S. Cl. .............. 106/808; 106/725; 106/727; 106/823
(58) Field of Search ................ 106/727, 808, 106/823, 725

(56) References Cited

U.S. PATENT DOCUMENTS

| 4,375,987 | A | 3/1983 | Lange et al. ............... 106/95 |
| 4,943,323 | A | 7/1990 | Gartner et al. ............. 106/808 |
| 4,990,190 | A | 2/1991 | Myers et al. ............... 106/727 |
| 5,017,234 | A | 5/1991 | Gartner et al. ............. 106/781 |
| 5,084,103 | A | 1/1992 | Myers et al. ............... 106/727 |
| 5,977,224 | A | 11/1999 | Cheung et al. ............. 524/249 |

FOREIGN PATENT DOCUMENTS

| CA | 1163651 | | 3/1984 |
| CA | 1224495 | | 7/1987 |
| JP | 10-324550 | * | 12/1998 |
| WO | WO98/51640 | | 11/1998 |
| WO | WO99/16724 | | 4/1999 |

* cited by examiner

Primary Examiner—Anthony Green
(74) Attorney, Agent, or Firm—Craig K. Leon; William L. Baker (57) ABSTRACT

New alkanolamine additives for improving the compressive strength, etc. of set cementitious compositions such as Portland cement concrete are described as having at least one alkanolamine or the salt thereof containing at least one alkanol group, and at least one ionic functional group other than hydroxyl group.

14 Claims, 5 Drawing Sheets

ADDITIVES FOR CEMENT MATERIALS AND CEMENT MATERIALS

FIELD OF THE INVENTION

The present invention pertains to a cement additive comprising a cement additive and to cementitious materials containing such an additive. The additive contains at least one alkanolamine or its salt, and at least one ionic functional group other than hydroxyl group.

BACKGROUND OF THE INVENTION

Various substances have been known previously as agents for enhancing the strength of cement cured products, such as mortar and concrete, in which portland cement, mixed cement, etc., has been used. For instance, higher trialkanolamines, such as triisopropanolamine, N,N-bis-(2-hydroxyethyl)-N-(2hydroxypropyl)amine, tris-(2-hydroxybutyl)amine, etc., have been suggested. (See e.g., Japanese Kokai Patent No. Hei 3(1991)-183,647). The term "higher trialkanolamine" as used herein means and refers to a tertiary amine with at least one $C_3$–$C_5$ hydroxyalkyl group. Moreover, it is said that the strength of this cured product at ages of 7 days and of 28 days was enhanced by adding this trialkanolamine to mixed cement containing at least 4% C, AF, gypsum, and 5 to 80% filler or clinker base.

SUMMARY OF THE INVENTION

The above-mentioned higher trialkanolamines as used in the prior art contains a strong balance in their molecules between the hydrophilic hydroxyl and tertiary amine groups and the hydrophobic alkylene groups (a so-called hyidrophilic-hydrophobicbalance) and exhibits foamability in cement compositions. Consequently, if large quantities of higher trialkanolamines are used, the amount of air in the cured cement material product tends to be high. Therefore, a problem arises in that, even though the strength of the cement cured product has been enhanced, neutralization may be promoted by the increased amount of air, or long-term durability may be reduced due to salt damage or other factors.

Reducing the amount of air entrainer and adding anti-foaming agents during concrete manufacturing processes have been considered as a sort of solution to this problem. However, when a large amount of higher trialkanolamine is added, there is difficult in adjusting the amount of air entrainer and anti-foaming agent to coincide with this amount. Consequently, the first problem to be solved by the present invention is to provide a strength-enhancing agent to replace conventional higher trialkanolamines.

Another problem solved by the present invention is to provide a cement material that is dense and with which neutralization is delayed and there is good long-term durability.

As a result of proceeding with various studies of the above-mentioned problems, the inventors discovered that air entrainability can be improved and the short-term and long-term strength of the cement cured product can be increased when the additive for cement materials that is added is not simply an alkanolamine, but rather an alkanolamine that has at least one ionic functional group other than a hydroxyl group.

The present invention was completed based on this knowledge. The above-mentioned first problem is solved by additives for cement materials comprising at least one alkanolamine or its salt or derivative (e.g., ester) and at least one ionic functional group other than a hydroxyl group. In particular, the above-mentioned problem is solved by additives for cement materials selected from alkanolamines at least having one ionic functional group other than a hydroxyl group, and such alkanolamines may comprise at least two alkanol groups such as in, for example, trialkanolamine or monoalkyl dialkanolamine or their salts or derivatives.

Furthermore, it is preferred that the ionic functional groups be selected from, for example, the following: carboxyl groups, sulfonic acid groups, dicarboxylic acid monoester groups, and sulfonic acid monoester groups. The problem addessed in the present invention is further solved by additives for cement materials selected from compounds represented by the following general formula (I) and their salts:

General formula [I]

wherein $R_1$ and $R_2$ are a hydrogen atom or alkyl group with 1 to 3 carbons (preferably a hydrogen atom or methyl group) and $R_3$ is a 2-carboxylalkyl group (The alkyl group has 2 to 4 carbons, and is preferably an ethyl group or a propyl group.), hydroxycarboxylalkyl group (The alkyl group has 2 to 4 carbons, and is preferably an ethyl group or a propyl group.), 2-sulfoalkyl group (The alkyl group has 2 to 4 carbons.), or hydroxysulfoalkyl group (The alkyl group has 2 to 4 carbons, and is preferably an ethyl group or propyl group.). Furthermore, it is preferred that $R_3$ in general formula [I] be a 2-carboxyethyl group, 2-hydroxy-2carboxyethyl group, 2-sulfoethyl group, or 2-hydroxy-3-sulfopropyl group.

Moreover, the problem addressed in the present invention is solved by additives for cement materials selected from compounds represented by the following general formula [II] and their salts:

General formula [II]

wherein R is a vinylene group, phenylene group or alkylene group with 2 to 6 (and more preferably 2 to 4) carbons.

Moreover, the problem addressed in the present invention is solved by additives for cement materials selected from the group of compounds represented by the following general formula [III] and their salts.

General formula [III]

Furthermore, the salts of the above-mentioned compounds are preferably alkali metal salts, such as sodium or potassium salts, ammonium salts, or alkaline-earth metal salts such as calcium and magnesium salts. Moreover, the above-mentioned second problem is solved by a cement material characterized in that it contains at least the above-mentioned additive for cement materials and cement.

In addition, the problem addressed in the present invention is solved by cement material characterized in that it contains at least the above-mentioned additive for cement materials, as well as aggregate, and cement. Furthermore, the object of the present invention is accomplished by cement material which is characterized in that in addition to the above-mentioned components, it contains concrete admixture. The lower limit of the content of the above-mentioned additive for cement materials (weight ratio to total weight) is 0.001 wt %, preferably 0.01 wt %, while the upper limit is preferably 0.2 wt %. That is, if less than 0.001 wt % additive of the present invention, which is too small an amount, is added, there will be little effect in terms of enhancing strength. In contrast to this, more than 0.2 wt % can be added, but the improvement in terms of enhancing strength will not be high and the cost will increase.

Moreover, the above-mentioned additive for cement materials can be added during the cement manufacturing process. It can also be added during the cement admixture or concrete admixture manufacturing process. In addition, it can be added during the cement paste, mortar or concrete production process.

DESCRIPTION OF PREFERRED EMBODIMENTS OF THE INVENTION

The additives for cementitious materials of the present invention are selected from alkanolamines at least having ionic functional groups other than hydroxyl groups as well as alkanol groups and their salts. In particular, they are selected from alkanolamines at least having one ionic functional group other than a hydroxyl group as well as at least two alkanol groups (for instance, trialkanolamine or monoalkyl dialkanolamine) and their salts. The ionic functional groups are selected from, for instance, carboxyl groups, sulfonic acid groups, dicarboxylic monoester groups and sulfuric acid monoester groups.

The additives for cementitious materials of the present invention are particularly selected from compounds represented by above-mentioned general formula [I] and their salts. Furthermore, the R1 and R2 in general formula [I] are a hydrogen atom or alkyl group with 1 to 3 carbons (preferably a hydrogen atom or a methyl group), R3 is a 2-carboxylalkyl group wherein the alkyl group has 2 to 4 carbons, and preferably is an ethyl group or propyl group, hydroxycarboxylalkyl group wherein the alkyl group has 2 to 4 carbons, and is preferably an ethyl group or propyl group., 2-sulfoalkyl group wherein the alkyl group has 2 to 4 carbons, or hydroxysulfoalkyl group wherein the alkyl group has 2 to 4 carbons, and is preferably an ethyl group or propyl group. $R_3$ is a 2carboxyethyl group, 2-hydroxy-2-carboxyethyl group, 2-sulfoethyl group or 2hydroxy-3-sulfopropyl group, in particular.

The additives for cementitious materials of the present invention are selected from the group of compounds represented by the above-mentioned general formula [II] and their salts. Furthermore, R in general formula [II] is a vinylene group, phenylene group or alkylene group with 2 to 6 carbons (particularly an ethylene group, propylene group or butylene group). The additive for cement materials of the present invention is selected from compounds represented by the above-mentioned general formula [III] and their salts, in particular.

The salts of the above-mentioned compounds are alkali metal salts such as sodium and potassium salts, aluminum salts, or alkaline-earth metal salts such as calcium and magnesium salts. The particularly preferred additives for cement materials of the present invention are the following: the compound represented by the following structural formula (BHPAPME)

the compound represented by the following structural formula (BHEAHPS)

the compound represented by the following structural formula (BHPAPN), the compound represented by the following structural formula (BHEAPN)

etc.

The cement material of the present invention contains at least the above-mentioned additive for cement materials and cement. It can also contain the above-mentioned additive for cementitious materials, aggregate, and cement. It can further contain other filler materials such as limestone, etc. The lower limit of the content of additive for cementitious materials of the present invention (weight ratio to total weight) is 0.001 wt %, particularly 0.01 wt %, and the upper limit of the same is 0.2 wt %.

The method of adding the additive (strength-enhancing agent) for cementitious materials of the present invention is, for instance, addition during the cement production process. For example, it is added during pulverization of the mixture of cement clinker, gypsum, limestone, and other such fillers. It can also be added after pulverization. In addition, the additive can be added as each filler material is being ground individually. Moreover, it can also be added after this grinding process. The same is true in the case of using the additive during concrete filler material production, such as production of limestone powder, etc. When the additive of the present invention is added during concrete or mortar production, it can be added to any one of the materials or to several of the materials that will be used. It can also be added during mixing.

The additive for cement materials of the present invention (strength enhancer) can be concomitantly used with other additives, such as retarders, corrosion inhibiting agents, anti-foaming agents, AE agents, water-reducing agents, AE/water-reducing agents, high-performance water-reducing agents, high-performance AE water-reducing agents, fluidizers, agents to reduce segregation, set accelerators, antifreezing agents, cold-resisting agents, shrink reducing agents, heat of hydration inhibitors, alkali aggregate reaction inhibitors, blast furnace slag, fly ash, silica fume, natural pozzolan, expansive agents, and/or zeolite, etc.

The present invention is further illustrated in the following examples, as follows.

EXAMPLE 1

The following 5 types of alkanolamine compounds were used as strength enhancers for the cement materials:

| | |
|---|---|
| BHPAPME | Example 1 |
| BHEAHPS | Example 2 |
| BHPAPN | Example 3 |
| BHEAPN | Example 4 |
| TIPA (triisopropanolamine) | Comparative Example 1 |

Each of the above-mentioned alkanolamine compounds was added at 0.04 wt % to cement when concrete was being mixed and the amount of air in the fresh concrete at this time was determined in accordance with JISA 1128, while the concrete compressive strength at an age of 28 days was determined in accordance with JIS A 1108. The cement used in the concrete was commercial common portland cement. The mixing conditions are as shown in Table 1 below:

TABLE 1

| Water/cement ratio (wt %) | Fine aggregate percentage (%) | Quantity of material per unit volume of concrete (kg/m³) | | | | AE water-reducing agent (ml/m³) | AE auxiliary agent (%) |
|---|---|---|---|---|---|---|---|
| | | Water | Cement | Fine aggregate | Course aggregate | | |
| 60 | 50 | 176 | 293 | 896 | 927 | 732 | 0.0035 |

*The AE auxiliary agent is an air entraining agent and the amount is relative to cement wt %.
*The targeted fresh cement property is a slump value of 18 cm.
*The concrete mixing temperature is 20° C.
*The concrete was mixed for 2 minutes using a pan-type 55-liter forced-mixing mixer.
*The alkanolamine compound was used after being dissolved in water for concrete mixing.

Figure 1:
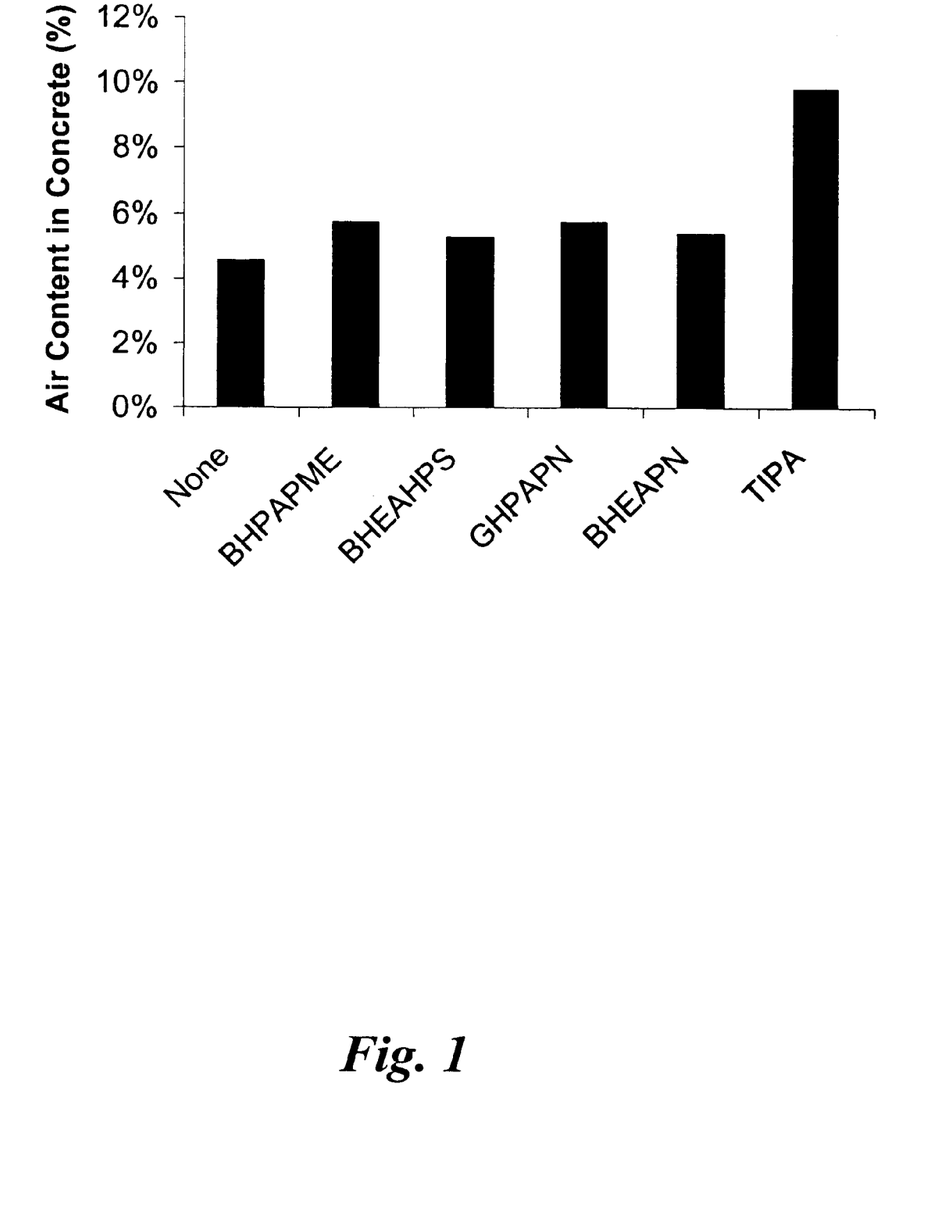
FIG. 1 is a bar graph illustrating the relationship between alkanolamine and the amount (%) of air entrained in the concrete.

The amount of air in the concrete that had been prepared is shown in FIG. 1. According to this figure, there was a large increase in the amount of air when TIPA, which is Comparative Example 1, was used, while when the alkanolamine compounds of the present invention were used, there was almost no change from the amount of air when no additive was added, indicating a marked improvement in air entraining tendency.

Figure 2:
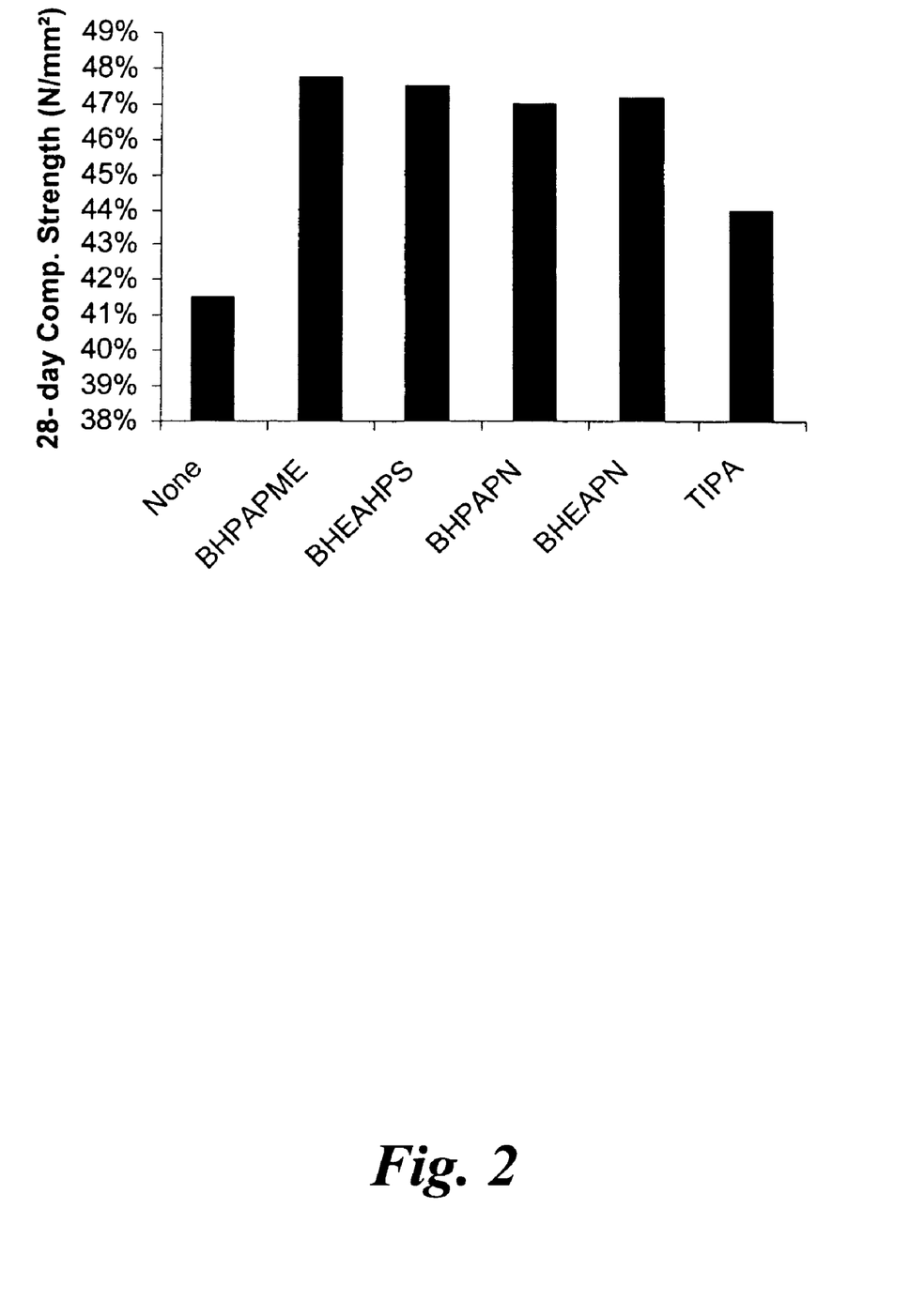
FIG. 2 is a bar graph illustrating the relationship between alkanolamine and concrete compressive strength 28 days after setting.

In addition, concrete compressive strength at an age of 28 days is shown in FIG. 2. According to this figure, an increase in compressive strength is also seen when TIPA of Comparative Example 1 is used. However, when the alkanolamine compound of the present invention was used, the increase in compressive strength was greater than that when the TIPA of Comparative Example 1 was used.

EXAMPLE 2

The amount of strength enhancer for cement materials that was added during mixing [BHEAHPS (Example 2)], [BHPAPN (Example 3)], [TIPA (Comparative Example 1)], etc., was varied, and the amount of air in fresh concrete was determined in accordance with the method in Example 1. The results are shown in FIG. 3.

Figure 3:
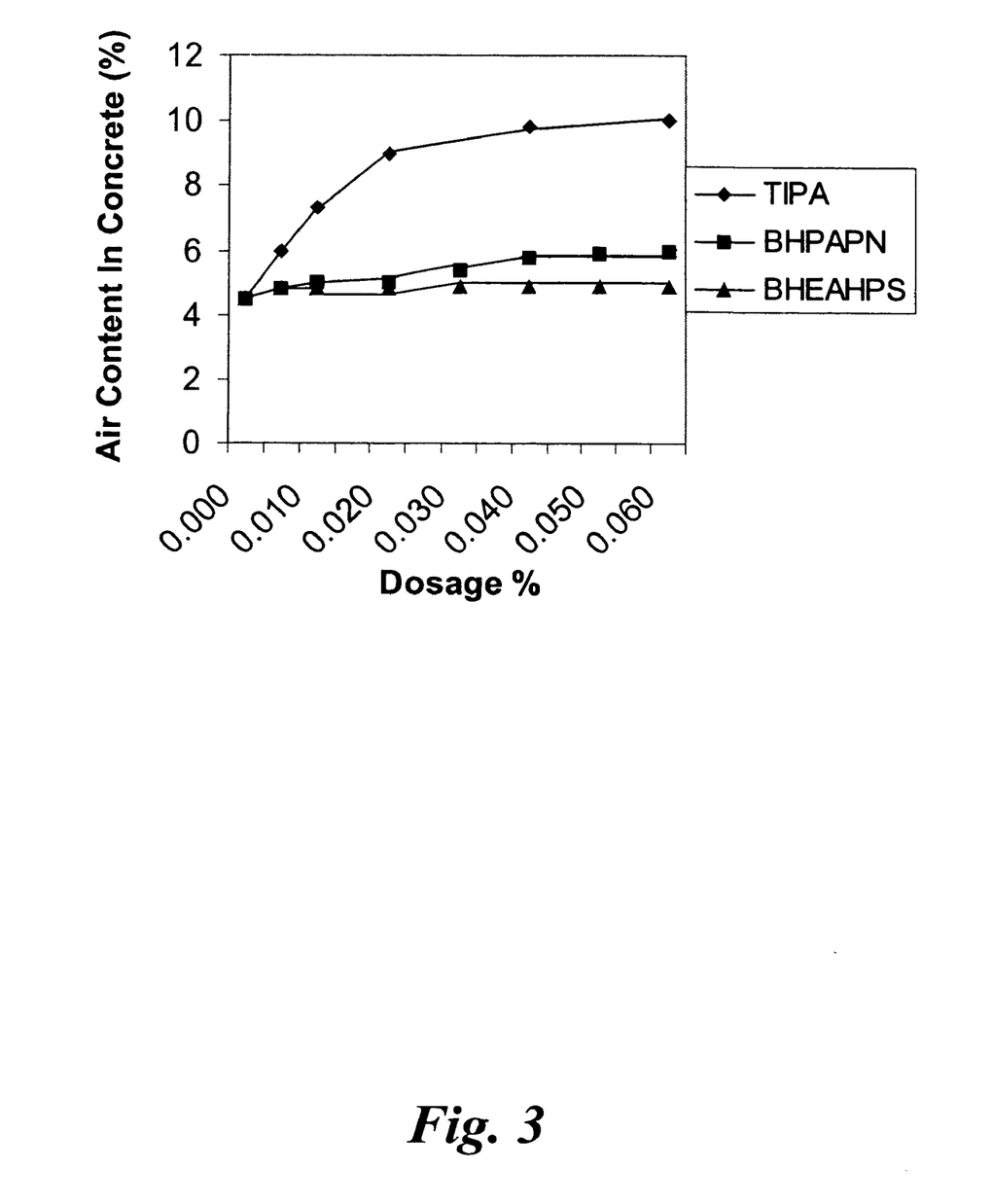
FIG. 3 is a graph illustrating the relationship between the amount of alkanolamine added and the amount of air contained in the concrete.

As is clear from FIG. 3, there is a marked increase in the amount of air with increased addition of TIPA added. In contrast to this, when the alkanolamine compound of the present invention was used, the amount of air was much less than when TIPA was used. For instance, even when 0.06% BHEAHPS was used, the amount of air was approximately the same as when 0.005% TIPA was used.

Figure 4:
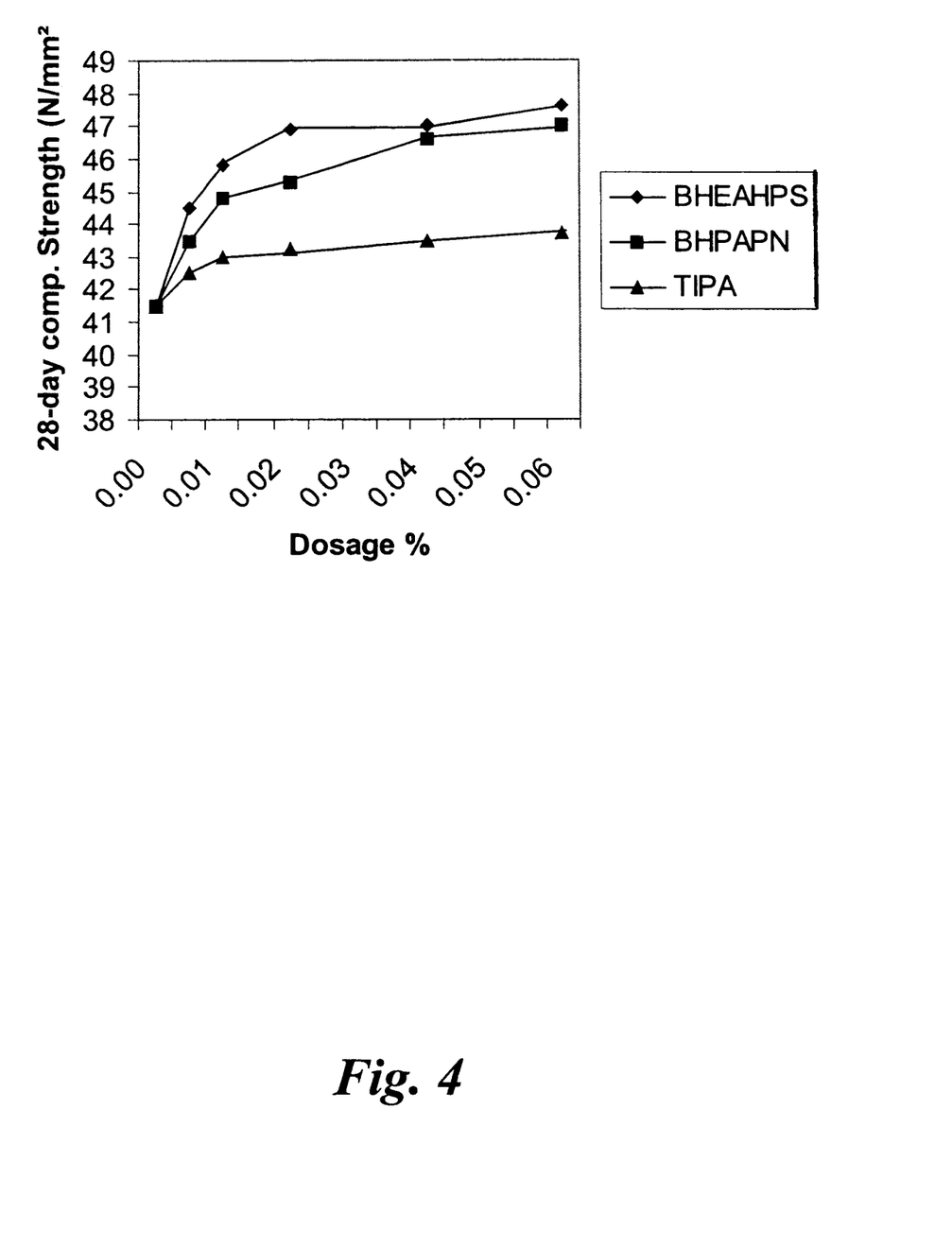
FIG. 4 is a graph illustrating the relationship between the amount of alkanolamine added and increase in 28-day concrete compressive strength.

Moreover, the compressive strength of the concrete at an age of 28 days was investigated in accordance with the method in Example 1 and the results are given in FIG. 4. According to this figure, there is an increase in compressive strength with an increase in the amount of alkanolamine compound. In particular, when the amount is 0.01% or more, the increase in compressive strength is marked.

An increase in compressive strength is seen when the TIPA of Comparative Example 1 is used. However, the increase in compressive strength when the alkanolamine compounds of the present invention were used was greater than that when the TIPA of the present invention was added.

EXAMPLE 3

The strength-enhancing agents for cement materials in Example 1 were added at 0.04% during mortar mixing and JIS R 5201 mortar strength tests were performed. The results are listed in Table 2.

TABLE 2

| Strength-enhancing agent | Limestone powder (wt %) | Mortar compressive strength (N/mm$^2$) | | | Percentage increase in strength (%) |
|---|---|---|---|---|---|
| | | 3 days | 7 days | 28 days | |
| Example 1 | 0 | 18.3 | 27.2 | 47.0 | +14 |
| | 10 | 17.1 | 26.8 | 44.4 | +25 |
| Example 2 | 0 | 18.1 | 27.5 | 45.7 | +11 |
| | 10 | 16.5 | 26.5 | 43.0 | +21 |
| Example 3 | 0 | 17.8 | 27.9 | 46.1 | +12 |
| | 10 | 16.4 | 26.2 | 43.3 | +22 |
| Example 4 | 0 | 17.7 | 27.6 | 45.7 | +12 |
| | 10 | 17.2 | 26.5 | 43.0 | +20 |
| Comparative Example 1 | 0 | 17.9 | 28.3 | 47.0 | +14 |
| | 10 | 16.3 | 27.4 | 43.9 | +24 |
| Comparative Example 2 | 0 | 17.2 | 26.3 | 41.2 | — |
| | 10 | 15.0 | 23.8 | 35.5 | — |

*Alkanolamine compound was used after being dissolved in water for mixing concrete.
*Limestone powder had a plain relative surface area of 4,010 cm$^2$/g and the ratio added is 10% of the mixture.
*No strength-enhancing agent was added in Comparative Example 2.
*The percentage increase in strength is presented in comparison to the 28-day mortar strength when no strength-enhancing agent was added.

As is clear from Table 2, the use of the alkanolamine compounds of the present invention has strong activity in terms of enhancing strength, regardless of the age of the material or whether or not limestone was used. Strength-enhancing activity was particularly high when limestone was added.

EXAMPLE 4

The amount of strength-enhancing agent for cement materials [BHEAHPS (Example 2)], [BHPAPN (Example 3)], TIPA (Comparative Example 10) was varied and limestone powder with a plain relative surface area of 4,010 cm2/g was mixed in an amount of 10% of the mixture. Mortar strength tests were performed at an age of 28 days in accordance with the method of JIS R 5201 and the results are shown in FIG. 5.

Figure 5:
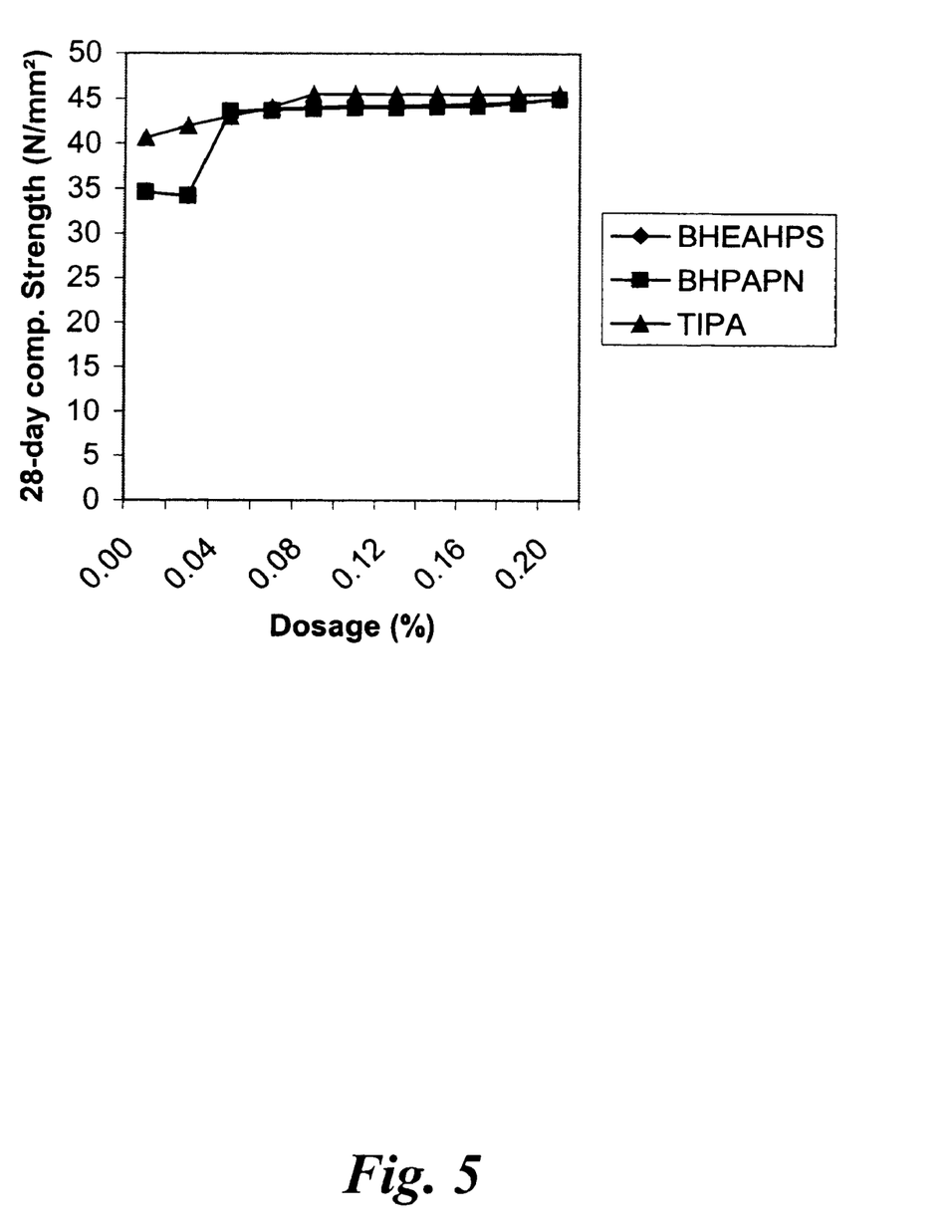
FIG. 5 is a graph illustrating the relationship between the amount of alkanolamine added and mortar compressive strength after 28-days.

As is clear from FIG. 5, the use of the alkanolamine compounds of the present invention improves mortar strength when the amount used is also increased. Furthermore, although the compressive strength is somewhat lower with the additives of the present invention than with TIPA, since the amount of air in the concrete is approximately 10% when the amount of TIPA added was only 0.04%, there is actually a limit on the amount of TIPA used. That is, the improvement in strength is limited with TIPA].

However, when the alkanolamine compounds of the present invention were used, the amount of air in the concrete was only approximately 5% when 0.04 wt % was added and therefore, there is little restriction on the amount added. Consequently, the strength enhancement effect of the present invention is practically not inferior to TIPA.

The additives of the present invention provide products with reduced entrained air, and therefore, the amount used can be increased to increase activity in terms of enhancing strength. Moreover, the cement materials containing the additive of the present invention (cement cured product) have an increased strength and are dense and therefore, neutralization is delayed and the cement product is very durable.

The foregoing is provided by way of illustration and is not intended to limit the scope of the invention.

It is claimed:

1. An additive for cementitious materials, comprising: at least one alkanolamine or salt thereof, said at least one alkanolamine or the salt thereof comprising at least one alkanol group and at least one ionic functional group other than a hydroxyl group.

2. The additive of claim 1 wherein said at least one alkanolamine has at least two alkanol groups.

3. The additive of claim 1 wherein said at least one alkanolamine is a trialkanolamine or a monoalkyl dialkanolamine.

4. The additive of claim 1 wherein said at least one ionic functional group comprises a carboxyl group, a sulfonic acid group, a dicarboxylic acid monoester group, a sulfonic acid monoester group, or salts or derivatives thereof.

5. The additive of claim 1 where said at least one alkanolamine is represented by the following general formula [I] or salt thereof:

General formula [I]

wherein $R_1$ and $R_2$ are a hydrogen atom or alkyl group with 1 to 3 carbons, and $R_3$ is a 2-carboxylalkyl group having 2 to 4 carbons in the alkyl group, hydroxycarboxylalkyl group having 2 to 4 carbons in the alkyl group, 2sulfoalkyl group having 2 to 4 carbons in the alkyl group, or hydroxysulfoalkyl group having 2 to 4 carbons in the alkyl group.

6. The additive of claim 1 wherein said alkanolamine has the general formula [II] or salt thereof:

General formula [II]

wherein R is a vinylene group, phenylene group or alkylene group with 2 to 6 carbons.

7. The additive of claim 1 wherein said alkanolamine has the following general formula [III] or salt thereof:

General formula [III]

8. The additive of claim 1 wherein the salt is an alkali metal salt, ammonium salt, or alkaline-earth metal salt.

9. Cementitious material comprising a cementitious binder and the additive of claim 1 in an amount of from 0.001 to 0.2 wt % based on the cementitious binder.

10. Cementitious material of claim 9 further comprising at least one aggregate selected from the group consisting of fine aggregate and coarse aggregate.

11. Cementitious material of claim 9 further comprising a concrete admixture selected from the group consisting of set retarders, corrosion inhibiting agents, anti-foaming agents, air entraining agents, water-reducing agents, air entraining/water-reducing agents, fluidizers, agents to reduce segregation, set accelerators, antifreezing agents, shrink reducing agents, heat of hydration inhibitors, and alkali aggregate reaction inhibitors.

12. A cementitious material provided by combining the additive of claim 1 with clinker and grinding the clinker to produce cement.

13. Cementitious material obtained by adding the additive of claim 1 to a cementitious binder.

14. A cementitious material obtained by combining the additive of claim 1 with clinker and grinding the clinker to produce cement; and thereafter adding to the cement at least one aggregate and water, thereby to provide a cement paste, a mortar, or a concrete.

* * * * *